United States Patent Office 3,840,600
Patented Oct. 8, 1974

3,840,600
2,6-DISUBSTITUTED PHENYL HYDRAZIDES
Marcel K. Eberle, Madison, N.J., assignor to Sandoz-Wander, Inc., Hanover, N.J.
No Drawing. Continuation-in-part of application Ser. No. 166,320, July 26, 1971, which is a continuation-in-part of abandoned application Ser. No. 105,608, Jan. 11, 1971, which in turn is a continuation of abandoned application Ser. No. 12,472, Feb. 18, 1970. This application Sept. 6, 1972, Ser. No. 286,746
Int. Cl. C07c *109/08*
U.S. Cl. 260—562 H    2 Claims

ABSTRACT OF THE DISCLOSURE

Organic acid, 2-(2,6 - disubstituted phenyl)hydrazides, e.g., crotonic acid, 2-(2,6-dichlorophenyl)hydrazide, are prepared from 2,6-disubstituted phenyl hydrazine and acyl halides and are useful as central nervous system depressants.

---

This application is a continuation-in-part of application Ser. No. 166,320, filed July 26, 1971, which in turn is a continuation of application Ser. No. 105,608, filed Jan. 11, 1971, now abandoned, which in turn is a continuation of application Ser. No. 12,472, filed Feb. 18, 1970, now abandoned.

This invention relates to novel organic acid derivatives of 2,6-disubstituted phenyl hydrazines and their preparation. In particular, the application relates to organic acid, 2-(2,6-disubstituted phenyl)hydrazides, their pharmaceutically acceptable acid addition salts and their use as central nervous system depressants.

The compounds of this invention may be represented by the formula:

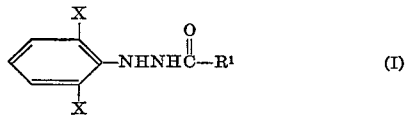

where

X represents halo having an atomic weight of about 19 to 36 or lower alkyl, i.e., alkyl having 1 to 4 carbon atoms, e.g., methyl, ethyl, isopropyl and the like, and $R^1$ represents lower alkyl; hydroxy lower alkyl, i.e., hydroxy alkyl having 1 to 4 carbon atoms, e.g., hydroxymethyl, β-hydroxyethyl, γ-hydroxypropyl, and the like; chloro lower alkyl, i.e., chloroalkyls having 1 to 4 carbon atoms, e.g., chloromethyl, β-chloroethyl, γ-chloropropyl and the like; lower alkenyl, i.e., alkenyl having 2 to 4 carbon atoms, e.g., vinyl, allyl and the like; benzyl or

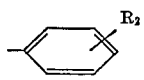

where $R^2$ is hydrogen; halo having an atomic weight of about 19 to 36, or lower alkyl.

The process for preparing compounds of formula (I) is illustrated by the following flow diagram:

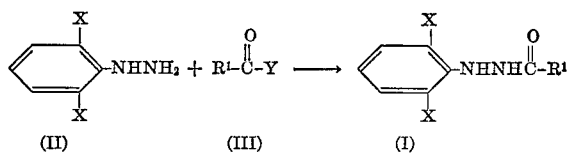

where

Y is halo having an atomic weight of about 35 to 80; and X and $R^1$ are as defined above.

The product (I) is prepared by treating a substituted phenylhydrazine (II) with an acid chloride (III). The reaction can be carried out in excess reagent but it is preferred that an inert solvent be employed. The preferred solvents are hexane, heptane and diethyl ether, especially diethyl ether. A base, e.g., sodium hydroxide or sodium carbonate is normally added to remove the hydrochloric acid formed in the reaction. Although the temperature is not critical, it is preferred that the process be carried out at a temperature between about —20 to 30° C., especially between about —10 to 10° C. The final product is recovered by conventional techniques, e.g., evaporation and recrystallization.

This invention also encompasses the pharmaceutically acceptable acid addition salts of the compounds of formula I, which are prepared by conventional methods, i.e., by treating the compounds of formula I in base form with the desired acid, e.g., hydrochloric acid, sulfuric acid, acetic acid, maleic acid, sucinnic acid, citric acid, tartaric acid and the like.

Certain of the compounds of formulas (II) and (III) are known and may be prepared by methods described in the literature. The compounds of formulas (II) and (III) not specifically described in the literature may be prepared by analogous methods from known materials.

The compounds of formula (I) possess pharmacological activity. More particularly, the compounds possess central nervous system depressant activity as indicated, by their activity in mice administered the active agent and tested according to the 30-word adjective check sheet system basically as described by Irwin, S. (Gordon Research Conference, Medicinal Chemistry 1959) and Chen (Symposium on Sedative and Hypnotic Drugs, Williams and Wilkins, 1954).

The compounds of formula (I) are also useful as minor tranquilizer-sedative-hypnotics as indicated by their activity in mice administered the active agent and tested according to the 30-word adjective check sheet system basically as described by Irwin, S. (Gordon Research Conference, Medicinal Chemistry 1959) and Chen (Symposium on Sedative and Hypnotic Drugs, Williams and Wilkins, 1954), by the hexobarbital reinduction test in mice using modifications of the method reported by Winter (J. Pharmacol. and Exp. Therap., *94*: 7, 1948) wherein immediately after the animals recover their righting reflex which was lost upon the administration of hexobarbital, "reinduction" is stated to occur if the animals once again lose their righting reflex; and by the shock-induced fighting mice test using a modification of the method described by Tedescki *et al.,* J. Pharmacol. Exp. Therap. *125*:28–34, 1969.

The compounds of formula (I) or the salts of these compounds may be combined with a pharmaceutically acceptable carrier or adjuvant. They may be administered orally or parenterally. For this use, the dosage will vary depending upon the mode of administration utilized and the particular compound employed. However, in general, satisfactory results for the above uses are obtained when the compounds are administered at a daily dosage of from about 1 milligram to 200 milligrams per kilogram of animal body weight. This daily dosage is preferably given in divided doses, e.g., 2 to 4 times a day, or in sustained release form. For most large mammals, the total daily dosage is from about 75 to 1000 milligrams, and dosage forms suitable for internal administration comprise from about 20 milligrams to about 500 milligrams of the compound in admixture with a solid or liquid pharmaceutical carrier or diluent.

A representative formulation suitable for oral administration is a capsule prepared by standard techniques which contains the following:

| Ingredient | Weight (mg.) |
|---|---|
| Crotonic acid, 2-(2,6-dichlorophenyl)-hydrazide | 50 |
| Inert filler (lactose, kaolin, starch, etc.) | 250 |

EXAMPLE 1

Crotonic acid, 2-(2,6-dichlorophenyl)hydrazide

In a flask equipped with a stirrer, 53.0 g. of 2,6-dichlorophenyl hydrazine are dissolved in 500 ml. of diethyl ether; and 240 ml. of aqueous 2N sodium hydroxide are added to the solution. The mixture is cooled in an ice bath, and 31.3 g. of crotonyl chloride are added dropwise with stirring. After addition is completed, the mixture is stirred for an additional 30 minutes, and 500 ml. of diethyl ether is added. The organic layer is separated from the aqueous layer, washed with water, dried and evaporated. The crude product is recrystallized from 1:1 ether-hexane, to yield crotonic acid, 2 - (2,6 - dichlorophenyl)-hydrazide; m.p. 146–148° C.

When the above process is carried out and isobutyryl chloride, γ - hydroxybutyryl chloride, γ - chlorobutyryl chloride, benzoyl chloride, p - chlorobenzoyl chloride, o-toluoyl chloride or phenylacetyl chloride is used in place of crotonyl chloride, there is obtained isobutyric acid, 2-(2,6-dichlorophenyl)hydrazide, 178°–179° C., γ-hydroxybutyric acid, 2 - (2,6 - dichlorophenyl)hydrazide, 106°–107° C., γ-chlorobutyric acid, 2 - (2,6 - dichlorophenyl)hydrazide, 109°–110° C., benzoic acid, 2-(2,6-dichlorophenyl)hydrazide, 141°–142° C., p-chlorobenzoic acid, 2-(2,6-dichlorophenyl)hydrazide, 168°–170° C., o-toluic acid, 2-(2,6-dichlorophenyl)hydrazide, 145°–146° C., or phenyl acetic acid, 2-(2,6-dichlorophenyl)hydrazide, 102°–104° C., respectively.

EXAMPLE 2

Crotonic acid, 2-(2,6-dimethylphenyl)hydrazide

Following the procedure of Example 1 and using 51.6 g. of 2,6-dimethylphenyl hydrazine dissolved in 500 ml. of ether, 280 ml. of aqueous 2N sodium hydroxide and 31.2 g. of crotonyl chloride, there is obtained crotonic acid, 2 - (2,6 - dimethylphenyl)hydrazide; m.p. 158°–160° C.

When isobutyryl chloride, γ - hydroxybutyryl chloride, γ - chlorobutyryl chloride, benzoyl chloride, p - chlorobenzoyl chloride, o-toluoyl chloride or phenylacetyl chloride is used in place of crotonyl chloride in the process of this example, isobutyric acid, 2-(2,6 - dimethylphenyl)hydrazide, 126° C., γ-hydroxybutyric acid, 2 - (2,6 - dimethylphenyl)hydrazide, (oil), γ - chlorobutyric acid, 2-(2,6-dimethylphenyl)hydrazide, 82°–83° C., benzoic acid, 2-(2,6-dimethylphenyl)hydrazide, 134°–135° C., p-chlorobenzoic acid, 2-(2,6 - dimethylphenyl)hydrazide, 167°–169° C., o-toluic acid, 2 - (2,6 - dimethylphenyl)hydrazide, 151°–153° C., or phenyl acetic acid, 2-(2,6-dimethylphenyl)hydrazide, 101°–103° C., respectively is obtained.

What is claimed is:

1. The compound which is crotonic acid, 2-(2,6-dichlorophenyl)hydrazide.

2. The compound which is crotonic acid, 2-(2,6-dimethylphenyl)hydrazide.

References Cited

UNITED STATES PATENTS

| 2,743,279 | 4/1956 | Reynolds et al. | 260—562 |

FOREIGN PATENTS

| 1,418,676 | 10/1965 | France | 260—562 |
| 1,492,641 | 7/1967 | France | 260—562 |

OTHER REFERENCES

Usui et al., Yakugaku Zassh., vol. 87, p. 38—41, 43—65 (1967).

HARRY I. MOATZ, Primary Examiner

U.S. Cl. X.R.

260—558 H; 424—324